Sept. 29, 1942.  O. FUSCALDO  2,297,399

INTERNAL COMBUSTION ENGINE FUEL INJECTOR

Filed Nov. 21, 1939  2 Sheets-Sheet 1

Ottavio Fuscaldo
Inventor,
by Morrison, Kennedy & Campbell
Attorneys.

Sept. 29, 1942. O. FUSCALDO 2,297,399
INTERNAL COMBUSTION ENGINE FUEL INJECTOR
Filed Nov. 21, 1939 2 Sheets-Sheet 2
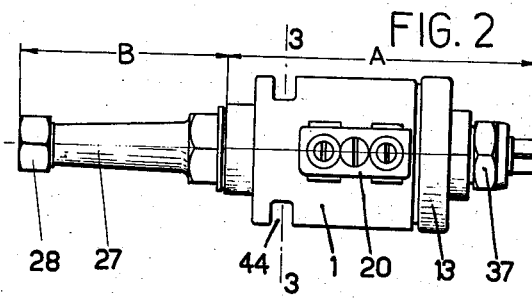
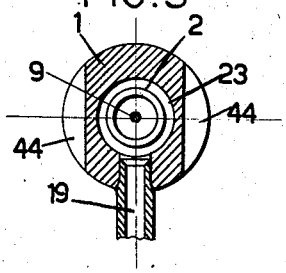
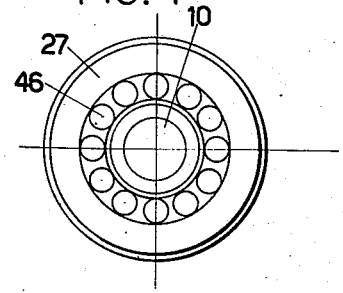
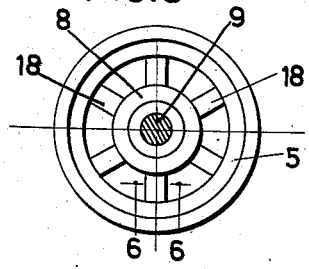
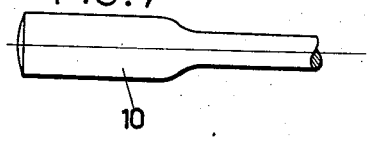
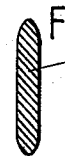
Ottavio Fuscaldo
Inventor
by Morrison Kennedy & Campbell
Attorneys Patented Sept. 29, 1942

2,297,399

UNITED STATES PATENT OFFICE 2,297,399

INTERNAL COMBUSTION ENGINE FUEL INJECTOR

Ottavio Fuscaldo, Milan, Italy; vested in the Alien Property Custodian

Application November 21, 1939, Serial No. 305,419 In Italy January 20, 1939

5 Claims. (Cl. 137—139)

This invention is for improvements in or relating to internal combustion engine fuel injectors and is concerned with an electromagnetically operated injector of the type comprising a magnetic means or solenoid working in opposition to a spring for opening and closing the valve. In the illustrated form is shown, in combination, a movable armature or core, preferably subject to a yielding control, solid with a valve stem and valve controlling the fuel outlet-nozzle, an electric winding for creating a magnetic flux in a magnetic circuit for periodically attracting the armature, thus closing the magnetic circuit, the magnetic circuit being formed entirely of magnetic material and the movable armature being operable independent of the action (pressure, viscosity, etc.) of the liquid fuel.

An electromagnetically controlled injecting system may comprise an injector or a number of injectors of the described type, a current distributor, a fuel-feeding apparatus delivering to the injector or to the injectors and a fuel-flow controlling apparatus. The efficiency of the system depends entirely on that of the ejector, especially at high speeds.

The main object of the invention is to provide highly efficient electromagnetic injectors, which entirely solve the faults of injection systems hitherto employed.

The electromagnetic injector has a distinct advantage over hydraulically or mechanically controlled injectors, avoiding the inherent defects thereof. It should, therefore, operate perfectly with high frequency injections, at very short intervals, as required by modern two-stroke and four-stroke engines, maintain its characteristics for long periods of operation, have such standard designs of parts as allow an easy reproduction on a manufacturing scale, and be capable of easy operation and maintenance.

In order that the electromagnetic injector can operate with high frequencies and exactly predetermined injections, even in a very short time and requiring the lowest possible current, it should:

(a) Be very highly efficient;
(b) Have very light moving parts;
(c) Have moving parts capable of moving very rapidly within the compressed fuel in which it is immersed;
(d) Have very small friction between the moving parts and the fixed parts;
(e) Have a very short valve stroke combined with a tight closure of the nozzle.

In order that the injector should maintain correct fuel delivery for a long period of operation, it is necessary (f) that the friction and percussion surfaces should be very hard and that (g) the inner parts in contact with the fuel should be stainless.

The injector should also be (h) readily demountable and adjustable by mechanics of average skill, without requiring the services of a specialist, and, finally, the construction should be of such a nature (i) that all the injectors built by mass production have identical characteristics. Thus, several injectors of a single multi-cylinder engine have practically equal fuel deliveries at all engine speeds.

In order that the invention may be readily understood an example thereof will be described with reference to the accompanying drawings, in which:

Figs. 1ª and 1ᵇ together constitute a longitudinal sectional view on an enlarged scale of an injector constructed according to the invention;

Figure 2 is a plan view of Figs. 1ª and 1ᵇ on a reduced scale;

Figure 3 is a cross section along the line 3—3 of Figures 1ᵇ and 2;

Figure 4 shows an enlarged end view of the guiding device of the valve;

Figure 5 is an end elevation of the movable armature or core;

Figure 6 is a cross sectional view of a wing or spoke of the armature along the line 6—6 of Figure 5; and Figure 7 illustrates a modified construction of the valve.

Figure 1A:
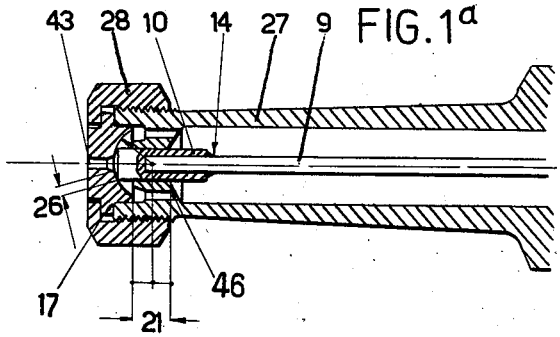

Referring to the drawings, the magnetic circuit of an injector according to the invention comprises a housing wall or shroud 1, end extensions or, flanges 2 and 3 therefor, a solenoid coil or winding 30, a central and preferably fixed armature or core 4 adjustably shiftable for adjusting the lift or travel of a valve 10, and a ring 5 (moving armature) fast upon or rigid with stem 9 of the valve.

The parts forming the magnetic circuit of the electromagnet are of very pure iron, having high magnetic permeability and very small coercive force and hysteresis, since the iron must magnetize rapidly as soon as the coil is energised and must demagnetize as rapidly and as completely as possible when the exciting current circuit is broken.

Figure 1B:
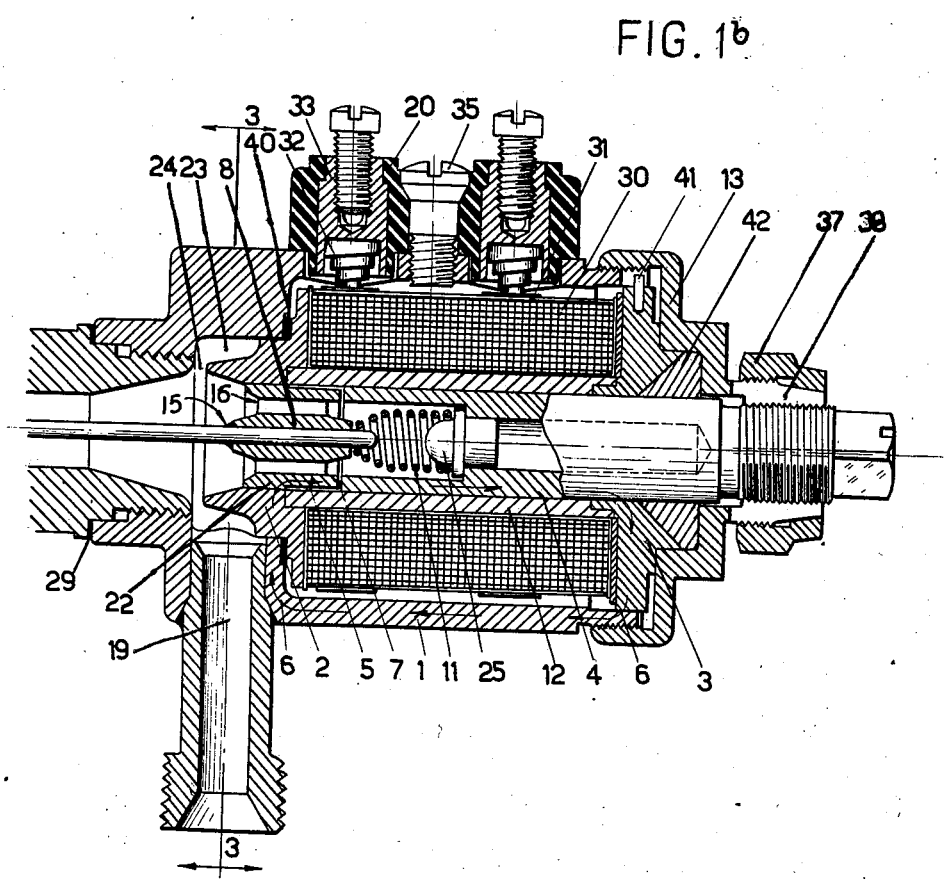

The magnetic circuit is indicated in Figure 1ᵇ by arrows 6, the only gap therein being in the axial end-clearance 7 between the fixed armature 4 and the moving armature 5, which clearance corresponds exactly to the stroke of the valve.

When the coil is energised, the movable armature 5 is attracted by the fixed armature 4 so that the end clearance is reduced to zero and the magnetic circuit closes. The side or radial clearance between the moving armature 5 and flange 2 guiding it, although minute, is a harmful gap which is required, however, for permitting the free shifting motion of sliding armature 5. This gap should be as small as possible, both for reducing to the utmost the reluctance of the magnetic circuit, by reducing the resistance to the magnetic flux through the thin film of fuel filling the whole cavity of the injector, and for reducing to a minimum the difference in thickness of the thin film at diametrically opposed points, when the armature 5 will be slightly displaced from the centre of flange 2; this second reduction reduces the concentration of the flux where the gap is least, which causes a side-attraction of the armature 5 with consequent appreciable losses due to friction.

Another undesirable gap appears in the side clearance between the fixed armature 4 and flange 3, but it can be reduced to a negligible value, since the armature 4 is not intended to slide freely as is the ring 5, but should only be thrust from the outside with a slight movement and only when adjusting the stroke of the valve.

The moving armature 5 is ring-shaped as is preferably also the end of the fixed armature 4 facing it. This effects a concentration of the magnetic flux on the two poles facing each other, causing them to saturate magnetically so as to increase to the utmost the attractive power of the electromagnet. Moreover, as the hub 8 connecting the ring armature 5 to the stem 9 of the valve 10 is made of non-magnetic material, for example bronze, and, for reasons stated hereinafter, since the stem 9 and the spring 11 are of tempered steel, this will prevent magnetic flux from dispersing in any great quantity in the stem and spring. On the contrary, the resilient spring 11 bears in opposition to the attractive force with its smallest convolution at the conical end thereof seated on the hub 8 projecting within the cavity of the hollow fixed armature 4.

As distinguished from the inside members 4 and 5 of the electromagnet, the enclosing wall 1 and flanges 2 and 3 are very thick so as easily to collect the lines of force, which, otherwise, would mainly tend to pass through the outer air, thus increasing the reluctance of the magnetic circuit.

Flanges 2, 3 have extending between them, surrounding the cores 4, 5, a tube 12, forming therewith a bobbin or spool on which the solenoid wire is wound. The tube 12 is made of non-magnetic material such as bronze and, therefore, receives no magnetic flux, which entirely passes through gap 7.

The housing or shroud 1 is closed by a screw-threaded end-cover 13, holding the bobbin in position. The end-cover 13 is also made of bronze, otherwise, if it were of iron as is the armature 4, the threads might in time be stripped because of adjustment, pure iron being very soft. If, however, it were made of steel, it would magnetize permanently and thereby impair the operation of the electromagnet.

The above precautions satisfy the condition (a) relating to high efficiency of the electromagnet.

With regard to condition (b) concerning the reduction in weight of the moving parts of the apparatus, this condition must be satisfied to ensure that the electromagnet is instantaneously attracted and to utilise to the utmost advantage the possibility of obtaining a quick opening of the valve.

The very light moving parts close the fuel flow through the combined thrust of the spring 11 and the pressure of the fuel which flows in the injector in the direction of closing, thus to offer the least resistance to the rapid closure of the valve. The light weight also reduces the shock at the end of the stroke caused either by abutment against the fixed armature or against the valve seat 17. In terming the thrusting device 11 a spring, this is intended to cover any analogous elastic or resilient device operable to restore the moving parts or close the valve; although under suitable conditions the liquid pressure might be operative to close the valve without an additional elastic device.

The injector is preferably made in two main parts, see Fig. 2, one part A enclosing the electromagnet and remaining outside the engine, and the other part B, forming the guide-piece and the seat of the valve which enters into the engine as far as required to bring the injection nozzle into the most convenient position in the combustion chamber according to the prevailing circumstances.

For this purpose the moving parts have a predetermined length and, in order to make this entity as light as possible, the connection of the valve 10 with the hub 8 which supports the armature 5 is formed by a very thin stem 9. Experience has shown that a solid rod of tempered steel is preferable for light weight and dimensions, consistent with resistance and rigidity. A hollow stem would be inadequate, due to the very slight forces it has to withstand.

Stem 9 is pressed into the bronze hub 8 and into the valve 10, the latter also being made of tempered steel; in order to increase the factor of safety, soft solder is added at the points 14 and 15.

As an alternative, as shown in Figure 7, the valve and stem can be made in a single piece, turned or ground out of a small rod.

The armature 5 is forced on to the wings or spokes of the hub or spider 8 and, for greater safety, is soft-soldered thereto at points 16 corresponding to the outside edges of wings 18.

The moving parts must, in accordance with condition (c) be capable of moving very rapidly and at a high frequency within the fuel under pressure which fills the chamber inside of the injector. Around hub 8 therefore are provided large free passages for the liquid between the two ends and the hub is small and displaces the least possible liquid without turbulence.

For the same purpose the inside left edges of the armature are chamfered, the wings 18 on the hub 8 are very thin and have tapered ends as shown in Figures 5 and 6, the hub 8 has tapering ends, the soldered parts 14 and 15 forming fillets, and the pitch of the spring 11 is equal to or even greater than the thickness of the wire.

It is also preferable that the fuel inlet into the injector should be between the moving armature and the nozzle so as not to force the fuel through the armature in its flow towards the nozzle, as such a passage, under violent impulses, would slow down the opening of the valve and delay the beginning of the injection. The arrangement should be such as to leave some liquid practically stagnant in the neighbourhood of the moving armature and spring.

It is also very useful to shape or stream-line the fixed parts between which the fuel flows before being sprayed out of the nozzle, to prevent or minimize turbulent flow. For this purpose the interior surface of the nozzle piece 17 is made concave and preferably spherical, the valve guide is tapered towards the nozzle and all the edges of the valve and of the nozzle are rounded out.

Condition (d) concerning reducing as much as possible the friction between the moving parts and the fixed part is required not so much for reducing wear, as for obtaining a greater speed in opening and closing the nozzle, equal attractive force of the electromagnet and pressure of the spring being assumed.

Among the many causes of friction, neglecting that due solely to the weight of the moving parts and to faulty design or workmanship, are:

1. An uneven distribution of the magnetic flux around the moving armature 5 of the electromagnet, due to excessive clearance or to the pressure of unsymmetrical holes or recesses in the shroud 1. In order to avoid the latter cause, the connecting hole or part for the entrance of the fuel by bronze pipe 19 is placed diametrally opposite to the recesses required for mounting the current supply terminal 20 (which terminal block is mounted on insulating material) so as to provide compensation or balancing of metal.

2. The difficulty of obtaining proper and perfect alignment between parts A and B of the injector. This difficulty is overcome by guiding the moving part of the injector at the end of the parts A and B, by means of guides formed in the very short portions 21 and 22, so short that they can assume the necessary inclination even when the clearances in the guides are very small. Notwithstanding the inclined position the invention secures the tightness of the valve closure as will be described hereinafter.

3. The side thrusts against the stem 9 caused by the fuel entering by impulses in the injector from the pipe 19. Such blows are avoided by causing the fuel to enter firstly into an annular chamber 23 and then from the latter into the central cavity of the injector through an annular passage or slot 24, coaxial with the stem 9.

4. Imperfections in the spring 11; when not properly centered on armatures 4 and 5 the spring does not keep straight enough and the bearing ends thereof are not parallel and square with the centre-line, or when the hardening is not uniform etc., side pressures in the armature 5 may arise. To overcome such possible difficulties centering devices are provided on the hub 8 by having stem 9 projecting, and on the armature 4 by means of a bronze plug or seat 25, the latter also contributing to a certain extent to the insulation of the spring 11 from the armature 4. The left hand end of the spring being conically shaped, it bears centrally on the hub 8 so as to compensate for unavoidable imperfections in construction.

5. The use of the same soft metal (soft iron) for the flange 2 and the armature 5. This would tend to cause seizure after a short period of operation. To prevent this, the surfaces are chromium-plated, this having further advantages set forth below.

The coefficient of friction of chromium against chromium being very low, the ability of the armature 5 to slide easily within flanges 2 is improved.

The requirement (e) of a short valve stroke and a tight closure of the valve are achieved, according to the invention, in the following manner. The tightness of the valve closure should be ensured even when the valve is slightly inclined due to imperfect alignment of parts A and B of the injector. To this end, whilst the guide 21 is placed very near to the seat of the valve, for reducing the friction, the seat itself is shaped as a hollow spherical cup, the spherical centre of which is preferably placed about half-way along the length of the guide 21 on the centre-line of the injector. The seat or the annular bearing 26 for the valve 10 has a rather small slope which is particularly favourable for effective valve lift, as it appears clearly that with the same effective section of the nozzle the lift of the valve is less the smaller is the slope of the seat thereof.

A further advantage of the spherical seat is that it is possible to grind it true and polish the surface by the same methods as are employed in preparing glass lenses, so as to avoid circular grooves concentric with the nozzle.

With regard to condition (f) concerning the provision of very hard friction and percussion surfaces, it is very important that once the injector is adjusted, it should maintain for a long time its orginal performance of constant volume of flow, there being assumed equal frequency and time of the injection, equal voltage of the current supply and constant density and viscosity of the fuel. For this purpose the clearances of the moving part within the guides 21 and 22 (to prevent existing friction from varying) and also the stroke should remain constant.

According to the invention this is obtained by employing very hard friction and percussion surfaces.

For the friction surfaces, the valve in the guide 21 is made of tempered steel and the guides of hard gun-metal; the guide 22, armature 5 and flange 2, being of very soft iron, are surface-hardened by an electro-plated layer of chromium, avoiding any heat treatment which might change the good magnetic properties of the iron.

As to the percussion surfaces, they are made of tempered steel for valve 10 and for the nozzle piece 17, sufficient for maintaining them in good conditions within safe practical limits. The mutually facing annular zones or ends of the soft iron armatures or core parts 4 and 5 are hardened by an electro-plated layer of chromium deposited with such care as to prevent it from peeling-off under continual percussion. To prevent the iron being caulked down under the layer of chromium the annular surfaces of the iron are initially hardened by mechanical rolling down or by any other suitable process.

The requirement (g) of freedom from oxidation of the inside surfaces in contact with the fuel is achieved as follows: Since the material should only be unattacked by the usual fuels, the parts of tempered steel and of bronze are practically corrosionless. On the contrary, the iron surfaces of the shroud 1 and of the flanges 2 which are not chromium-plated, as stated above, are protected with a light electro-plating.

The design of the apparatus in two parts A and B is particularly convenient both with regard to unified mass production and with regard to ease in assembling and fitting and in adjusting etc. according to conditions (h) and (i).

Part B can be unscrewed from part A and then screwed-on again, when required for cleaning, without changing the original adjustment of the valve stroke; the screwing on again of the parts should stop at a point previously marked-off, and any errors thereby incurred are quite negligible.

A washer 29 inserted between the two parts A and B is made of a material having a hardness equal to that of annealed copper, thus excluding the use of any plastic material.

The adjustment of the stroke of the valve (axial clearance 7) is obtained by screwing in or out the armature 4 relatively to the cover 13. For fixing the armature 4 in a desired position after adjustment, a nut 37 threaded in to the projection 38 of cover 13 is tightened. This nut has a conical extension surrounding the slotted conical extension 38 of the cover or cap 13, so that tightening the nut locks the threaded extension of the adjustable core 4 within the cover, without causing any radial pressure. This is very important for correct adjustment since otherwise a simple locknut or double nut screwed on to the armature 4 would cause a longitudinal movement of the armature, corresponding to the eventual clearance existing between the threads; while a lateral set-screw would shift the armature eccentrically.

It is clear that the above described adjustment can be brought about from the outside, even during the operation of the engine and by any known control means.

The nozzle piece 17 is fixed on the nozzle-carrier or chamber wall 27 by means of a union or nut 28 and can be easily removed, if necessary, for cleaning, and it can be replaced in position without altering the valve stroke and it can also readily be changed for another piece when required to alter the diameter of the injecting nozzle or orifice member 43.

The bobbin or spool formed by the tube 12 and end extensions 2 and 3 carries the winding 30 of insulated wire. This coil has on the outside thereof two thin strips 31 of silver or of silvered copper or the like, acting as contacts, to which are soldered the two ends of the winding conductor. The conducting springs 32, preferably of silvered false-gold, fixed to the two current input terminals 33 bear against the two contact strips 31.

The two terminals 33 are incorporated in an insulating block 20 secured to the shroud by a central screw 35.

The injector may be fixed to the engine by means of two brackets, not shown, entering into the lateral slots 44 of the shroud, seen in Fig. 2.

The bobbin, as stated above, is secured within the shroud by means of the threaded cover 13. A gasket 40 of any desired plastic material is placed between the end wall 2 of the bobbin and the interior end of the shroud to prevent the fuel from entering into the chamber of the bobbin, while a pin 41 projecting from end wall 3 into a slot in the shroud prevents the bobbin from rotating and wearing against the gasket 40 when the cover is being screwed home.

A gasket of graphitic asbestos 42 or of any other suitable material prevents the fuel from flowing out along the outside of core 4, but allows the core to be screwed in and out for adjustment.

The perfect coaxiality of the shroud 1 of the cover 13 and of the bobbin is of paramount importance in order that during adjustment the core 4 can slide in a straight line. For this purpose centering slots are provided as shown in the drawing.

A similarly perfect coaxiality is necessary between the guide 21 of the valve and the nozzle 17 having a spherical seat and to this end the guide is in one piece with the fuel pressure chamber or nozzle-carrier 27, the passage of the fuel around the guide being obtained through a plurality of holes 46.

The characteristics of the helical spring 11 (diameter of its convolutions and of the wire, number of turns, length, material and heat treatment) are, as stated above, very important inasmuch as they must be the same for all the injectors of a single engine, provided that in all injectors the distance between seats 8 and 25 against which the springs abut is maintained constant. It is preferable, as proved by experience, to use tempered steel wire for the springs because the efficiency of springs of stainless steel or phosphor bronze is reduced due to the fatigue stresses arising from the high frequency of operation and consequent vibrations.

The springs should have a low flexibility so that the thrust on the valve is light when the valve is closed (considering that the pressure of the fuel assists the valve to close) and becomes strong when the valve is open. Thus the opening begins rapidly when the force of attraction on the armature is slight due to the great air gap, the spring 11 contributing to braking the strong attraction at the end of the stroke and later facilitating the severance of the moving armature from the fixed armature, when on switching off the current the residual magnetism of the latter and its magnetic hysteresis, which always exist to a slight degree, tend to retain the armature.

In this way very quick opening and closing actions of the valve are ensured and very high frequencies of performance are possible.

Having now described my invention and how the same may be practiced, what I claim as my invention is:

1. An internal combustion engine injection apparatus of the kind recited having an elongated liquid fuel pressure chamber and an immersed valve and stem reciprocable longitudinally within the chamber with a short stroke of retraction against resilient return, in combination with electromagnetic means operable to retract and then release the valve stem, the same comprising a solenoid coil with a two-part iron core therein, one core part constituting an annular head fast on said stem and movable in the liquid therewith and of open construction for free liquid flow whereby it may shift without substantial obstruction from the liquid, the stem and head by their short stroke being adapted to leave a short magnetic gap between the two core parts in one position and to close such gap in the other position, and other iron parts constituting with said core parts a magnetic circuit disposed around said coil, said other iron parts comprising an outer housing wall, and inward extensions therefrom to the movable and the other core part respectively; said outer wall having a longitudinal extension beyond the movable core part formed with a liquid inlet, whereby a substantially stagnant space is left between said inlet and the core parts.

2. An injector as in claim 1 and wherein the housing is shaped to provide an annular entrance chamber receiving from the liquid inlet and distributing the inflow around the circumference, and an annular passage delivering inwardly from the entrance chamber to the pressure chamber; whereby pulsating lateral pressures on the valve stem are minimized and resulting friction and wear avoided.

3. An internal combustion engine injection apparatus of the kind recited having a liquid fuel pressure chamber and an immersed valve stem shiftable longitudinally within the chamber with a short stroke; a spring thrusting upon the stem to advance it, and electromagnetic means operable to retract and then release the valve stem, the same comprising a solenoid coil with a two-part iron core therein, both core parts extending bodily within the coil; one core part constituting an annular head or sleeve fast on said stem and movable in the liquid therewith and of open construction for free liquid flow whereby it may shift without substantial obstruction from the liquid, and the stem and head by their short stroke being adapted to leave a short magnetic gap between the two core parts when the stem is advanced and to close such gap when in retracted position, such gap being located in the space inside the solenoid coil; and other iron parts constituting with said core parts a magnetic flux circuit disposed around said coil, said other iron parts comprising an outer housing wall, a first inward extension therefrom within and through which the movable annular core part extends and is guided, and a second inward extension between the wall and the other core part; and said stem thrusting spring being a compressed spring interposed between the two core parts thereby acting to advance the movable core part and open the magnetic gap but adapted to be overcome by the magnetic pull of the solenoid.

4. An internal combustion engine injection apparatus of the kind recited having a liquid fuel pressure chamber and an immersed valve stem shiftable longitudinally within the chamber with a short stroke, a steel spring acting on the stem to advance it, and electromagnetic means operable to retract and then release the valve stem, the same comprising a solenoid coil with a two-part iron core therein, both parts extending into the space within the coil; one core part being longitudinally movable and comprising an annular sleeve of iron on said stem and shiftable in the liquid therewith, and of open construction for free liquid flow whereby it may shift without substantial obstruction from the liquid, the stem carrying a non-magnetic hub fast thereon and an open web between the hub and iron sleeve, and the other or fixed core part being of annular or sleeve construction at least at its end adjacent to the annular movable core part, the stem and head by their short stroke being adapted to leave a short annular magnetic gap inside the coil and between the two core parts in one position when the stem is advanced and to close such gap in the retracted position; and other iron parts constituting with said core parts a magnetic flux circuit disposed around said coil, said other iron parts comprising an outer housing wall, a first inward extension therefrom within which the movable core part or annular stem head is guided, and a second inward extension between the wall and the other core part; and said stem advancing spring being a compressed spring interposed between the two core parts acting to thrust the movable core part and open the magnetic gap but adapted to be overcome by the magnetic pull of the solenoid, said spring having its ends seated respectively on said movable core sleeve hub and within the annular fixed core part.

5. An injection apparatus as in claim 4 and wherein the movable sleeve hub is prolonged beyond the movable sleeve and beyond the core gap and protruded into the space within the fixed core sleeve, whereby the steel spring, seated on said hub and within the fixed sleeve, is located wholly inside the fixed core sleeve and removed from the magnetic gap; the spring being helical and conically tapered, with its smaller end seated on said hub.

OTTAVIO FUSCALDO.